United States Patent [19]

Christenson et al.

[11] Patent Number: 4,705,133
[45] Date of Patent: Nov. 10, 1987

[54] TAG AXLE ASSEMBLY FOR WORK VEHICLE

[75] Inventors: Ronald E. Christenson, Mantorville; Garwin B. McNeilus, Dodge Center, both of Minn.

[73] Assignee: McNeilus Truck and Manufacturing, Inc., Dodge Center, Minn.

[21] Appl. No.: 6,217

[22] Filed: Jan. 23, 1987

[51] Int. Cl.⁴ .................. B62D 61/12; B62K 13/00
[52] U.S. Cl. .................. 180/209; 280/81 R; 280/704
[58] Field of Search ............ 180/209; 280/704, 81 R, 280/81 A, 43.17, 43.23

[56] References Cited

U.S. PATENT DOCUMENTS

| | | | |
|---|---|---|---|
| 3,485,505 | 12/1969 | Schmidt | 280/81 R |
| 3,912,293 | 10/1975 | Harbers | 280/81 R |
| 4,146,243 | 3/1979 | Sims | 280/81 R |
| 4,314,709 | 2/1982 | Silbernagel | 280/81 A |
| 4,492,389 | 1/1985 | Wyatt et al. | 280/704 |

Primary Examiner—John J. Love
Assistant Examiner—Kenneth R. Rice
Attorney, Agent, or Firm—Orrin M. Haugen; Thomas J. Nikolai; Frederick W. Niebuhr

[57] ABSTRACT

An add-on wheel/axle assembly for truck-type vehicles for reducing the effective axle load of the vehicle allowing the carrying of greater payloads without violating governmentally imposed road restrictions. The assembly includes a hydraulically actuatable articulated arm assembly where one end of a first arm link is pivotally joined to opposed sides of the truck frame proximate its rear end and with wheels mounted on stub axles affixed to the other ends of said arm assemblies. A cross-member offset by a predetermined distance from the stub axles joins the arm assemblies together and a hydraulic cylinder is operatively coupled between the truck frame and the articulated arms for extending and retracting the wheels between a ground-engaging disposition and an elevated disposition. Tie bars and associated bell cranks also cooperate with the articulated arms to draw the wheels in a straddling disposition relative to the truck frame when the wheels are in their elevated disposition.

11 Claims, 9 Drawing Figures

TAG AXLE ASSEMBLY FOR WORK VEHICLE

BACKGROUND OF THE INVENTION

I. Field of the Invention

This invention relates to an auxiliary axle assembly for work vehicles such as cement trucks. More particuarly, the present invention relates to an improved tag wheel axle assembly attached to the rear end of the vehicle which can be lowered to a ground engaging, truck supporting position or retracted to an elevated position so that the wheels straddle the sides of the truck frame above the ground where they will not engage obstacles in the truck's path.

II. Discussion of the Prior Art

Recently, there have been numerous efforts to develop improved tag axle assemblies which are attachable to a truck so that heavy trucks can meet weight restrictions.

Many governmental entities place road restrictions limiting the amount of weight any vehicle can carry while traversing roads and highways within their jurisidiction. Federal weight laws have a specific formula involving axles, the spacing of axles, and the length of the truck wheel base. Greater loads may, therefore, legally be transported by increasing the number of load bearing axles and wheel base to help support the vehicle.

Weight restrictions also have been expressed as a function of the distance between axles. By increasing the distance between axles, the weight is distributed over a greater portion of the road surface. Many restrictions of this type can be met by increasing the distance between the front and "back" axles of the truck by supply an auxiliary axle assembly which can serve as the "back" axle assembly.

Since tag axle assemblies of the general type under consideration can be an impediment when the vehicle reaches the construction site and must travel over rough, uneven and sometimes muddy or soft terrain, it has been the practice to design such tag axle assembly so that the wheels may be elevated once the vehicle is about to leave the public road surface. Thus, a very important element of any tag axle assembly design is to be able to easily and positively raise the assembly to a position where the assembly will have as much ground clearance as possible yet maintain the longest possible truck horizontal center of gravity.

Various entities, including applicant's assignee, have patented or are attempting to patent devices intended to help vehicles meet load limit restrictions. Applicant's assignee, for example, is the licensee of U.S. Pat. No. 4,492,389 and the owner of U.S. patent application Ser. No. 813,419, filed Dec. 26, 1985. As will be made clear from the subsequent discussion of the preferred embodiment, the apparatus of the present invention is somewhat similar to the apparatus described in U.S. patent application Ser. No. 813,419. However, the present invention is a great improvement over that apparatus because it is fool proof when extending the axle and wheel assembly. It is also easier to build and maintenance is less costly. With the present invention, the two auxiliary hydraulic cylinders present in the design described in U.S. patent application Ser. No. 813,419 have been eliminated. They have been replaced by solid steel bars secured to the frame by rubber or spring mounted anchors. This important modification eliminates certain problems associated with the hydraulic circuit of the old design by eliminating certain valves, hoses, and cylinders. The elimination of these parts solves problems inherent in the earlier design such as hydraulic leaking, bad seals, stones nicking the hydraulic piston rod and chrome deterioration of the piston rod.

SUMMARY OF THE PRESENT INVENTION

The present invention is comprised of a new unique axle arrangement and a system of linkages activated by a single hydraulic ram which will permit the tag wheels associated with the arrangement to be elevated from a road engaging position to an alternate position in which the wheels straddle the side of the truck frame with the bottom of the tires being sufficiently high to clear uneven terrain yet low enough so as to not present a safety hazard.

The tag axle assembly of the present invention comprises a plurality of wheels journaled for rotation of stub axles. Each stub axle is secured by a king pin assembly to a first arm member which, in turn, is hingedly attached to a second arm member. The second arm member is secured to the frame of the truck body. Associated with each second arm means is a bracket. Each such bracket is secured to the hydraulic ram of the apparatus. The hydraulic ram is used to move the wheels from their ground engaging position to their retracted position or visa versa. To ensure proper movement of the arms, stub axles and wheels upon actuation of the hydraulic ram, two elongated tie bars are secured at one of their ends to the frame of the truck on opposite sides thereof and at their other ends are secured at a location at or near the point where the first arm is hinged to the second ram. Actuation of the hydraulic arm to retract the wheels to their stowed disposition next to the sides of the truck frame first causes the wheel assemblies to be swung upwardly from their ground engaging position while further retraction of the ram causes the first arm assemblies and the wheels attached thereto to be pulled longitudinally in the forward direction by pulling forces applied through the elongated bars.

OBJECTS

It is accordingly a principal object of the present invention to provide an improved tag axle assembly for a work vehicle.

A second object of the invention is to provide a tag axle assembly in which the auxiliary wheels thereon, by actuation of a single hydraulic ram, can be moved between a first ground engaging position and a second raised position in which the auxiliary wheels thereof straddle the sides of the truck frame at a point high enough where they will not come into contact with obstacles on the road.

A third object of the invention is to provide a novel auxiliary axle assembly in which each stub axle and its associated wheel are mounted so that they project outwardly from a first arm member, which is in turn hingedly attached a second arm member which is also secured to the frame of the truck and movable by means of a single hydraulic ram.

Still another object of the invention is to provide a rugged, steerable, selectively deployable tag axle assembly for a work vehicle wherein the motion of the tag axle during deployment and stowage thereof is governed by at least one elongated tie bar as it moves from the ground engaging position to the retracted position.

These and other objects and advantage of the invention will become apparent to those skilled in the art from the following detailed description of the preferred embodiment when considered in conjunction with the drawings in which like numbers are used to identify corresponding parts in the various views.

DESCRIPTION OF THE PREFERRED EMBODIMENT

Figure 1:
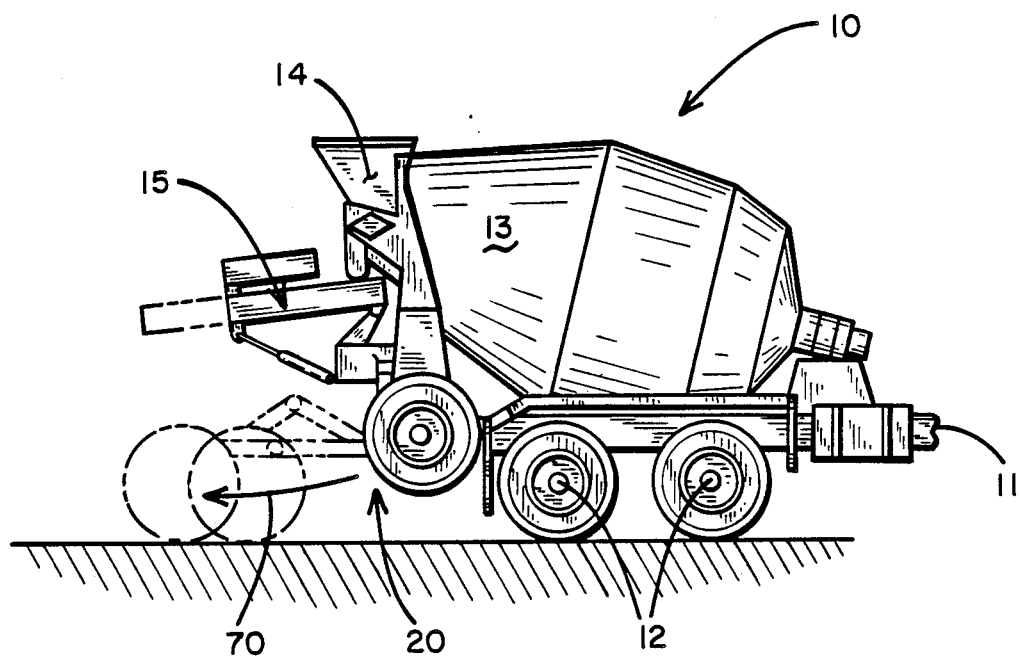
FIG. 1 is partial side elevation the ready-mix concrete truck incorporating the present invention showing the orientation of the tag axle assembly in its stowed position in solid line and its ground engaging position in phantom line.

FIG. 1 shows the rear portion of a work type vehicle, namely a ready mix concrete truck 10. Truck 10 includes a frame 11 which is supported above and ground by a plurality of wheel and rear tandem axle assemblies 12 in a conventional fashion. Supported above frame 11 is a rotatable mixer drum 13 having a funnel like opening 14 proximate the rear top then thereof through which stone, sand, cement, water and other additives can be loaded. The portion of vehicle 10 which is shown is mounted on a truck chassis or pulled to a construction site by a truck tractor. While in transit, drum 13 rotates the mixed ingredients contained therein. Once the vehicle arrives at the construction site, cement can be discharged via movable chute 15.

The present invention comprises a tag axle assembly which is indicated generally by numeral 20 in FIG. 1. Tag axle assembly 20 is shown in solid line form in FIG. 1 in its raised or stowed position and in phantom line representation as it is being extended to its load engaging position.

Figure 2:
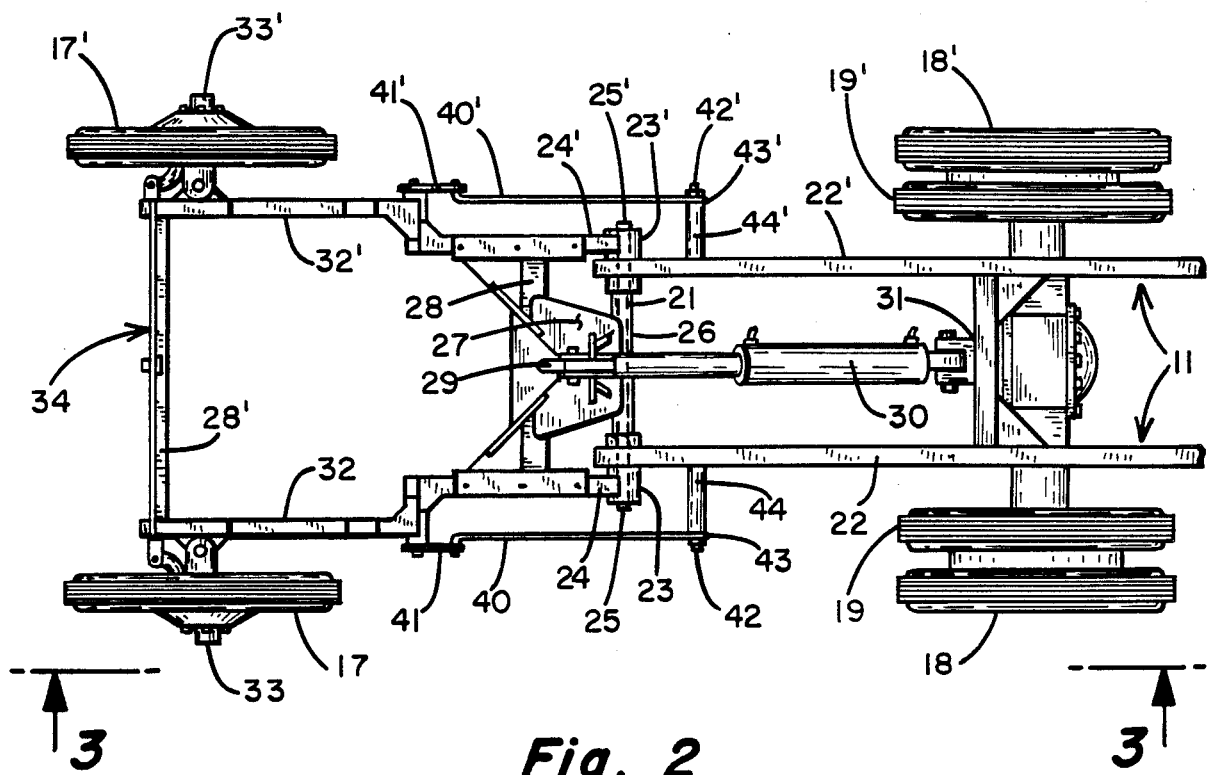
FIG. 2 is a top view of the truck frame showing tag axle assembly in the ground engaging position.
Figure 3:
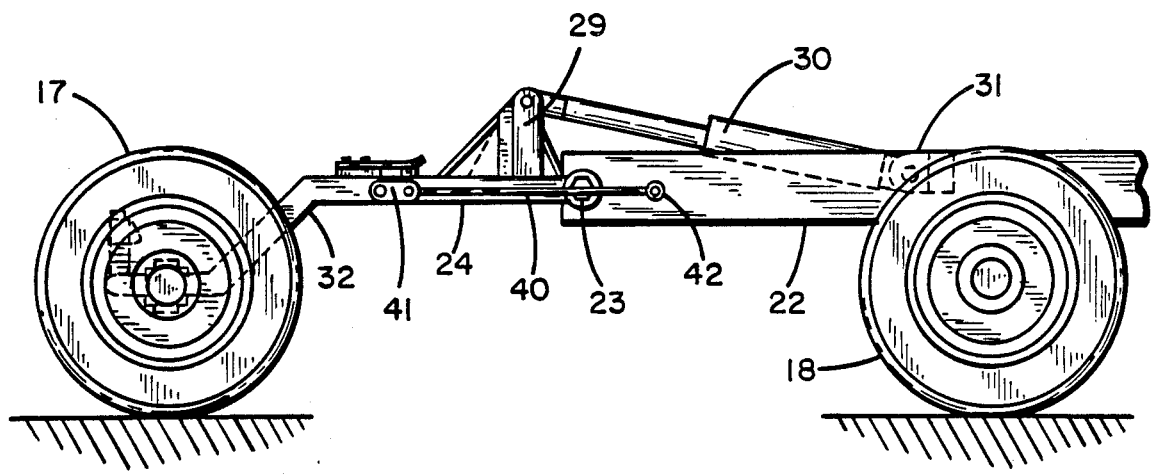
FIG. 3 is a side sectional view of the assembly taken along line 3—3 in FIG. 2.

FIGS. 2 and 3 are intended to show the constructional detail of the preferred embodiment including the means used to attach the tag axle assembly to the truck frame. Such means include two circular bores located opposite of each other on members 22 and 22' of frame 11. An elongated pivot pin 21 passes through the circular bracket in frame 11. Respective ends of the pivot pin 21 are then received within a cylindrical bore of a hub 23 and 23' which are associated with each of two torque arms 24 and 24' of the tag axle assembly. At each of its ends, pin 21 has an externally threaded segment which extends outward beyond the ends of hubs 23 and 23'.

Locknuts 25 and 25' are turned on to the respective threaded ends of the pivot pin 21 to secure it as well as hubs 23 and 23' to frame 11. This arrangement permits the torque arms 24 and 24' to be free to rotate about the pivot pin 21.

Also associated with pivot pin 21 is a steel pipe 26 which surrounds pivot pin 21 along its length between frame members 22 and 22'. The pipe 26 is free to rotate about pin 21. A heavy, rugged support plate 27 is welded along one of its edges to the steel pipe 26. The support plates opposite edge is welded to a cross beam which extends between and is secured at its ends to torque arms 24 and 24'. One function of the cross beam 28 is to keep the torque arms 24 and 24' in a generally parallel, spaced apart relationship. A second cross beam such as 28' can be added to provide additional strength. Projecting upwardly from the support plate 27 is a horn arm 29 which is bifurcated at its upper end so as to allow a clevis connection to be made thereto.

The apparatus used to move the tag wheel assembly of the present invention between its upper and lower dispositions is also shown in FIGS. 2 and 3. This apparatus includes a hydraulic cylinder 30 which is disposed between and pivotly joined at its ends to frame member 31 and horn arm 29.

Hinged to the rearward end of each of torque arms 24 and 24' is an angulated arm 32 or 32'. Angulated arms 32 and 32' are associated with stub axles 33 and 33' respectively. Stub axles 33 and 33' (which each have a wheel and tire associated therewith) are caster-mounted to the angular arm 32 and 32'. A tie rod 34 is disposed between the wheels in conventional fashion so that the wheels will be maintained in alignment with one another while the vehicle is cornering.

Figure 8:
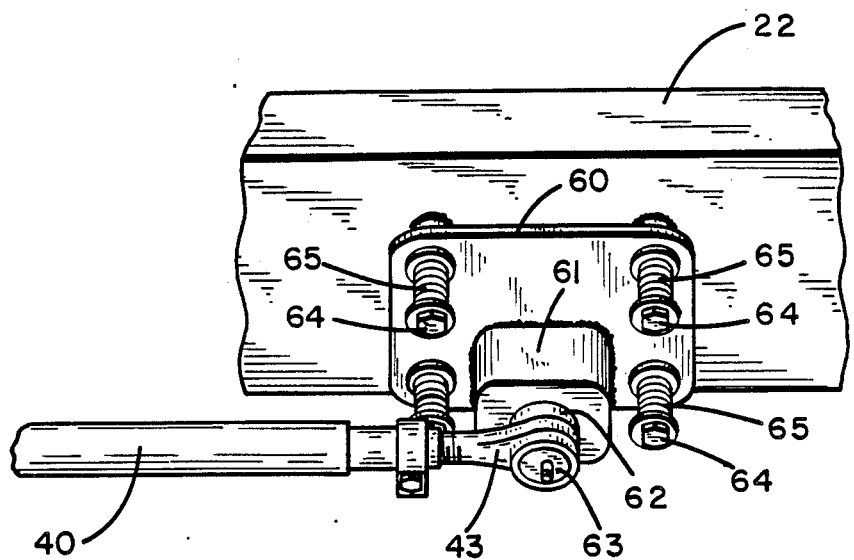
FIG. 8 shows an alternative means for pivotally connecting the tie bar of the assembly to the frame.

To ensure proper movement of the tag wheels upon actuation of the hydraulic cylinder 30 and to ensure proper positioning when the tag axle assembly is in the stowed position, tie bars 40 and 40' and bell cranks 41 and 41' have been added to each side of the apparatus. One of the ends of each bar 40 and 40' is secured to the respective frame member 22 or 22'. Such securement can be achieved by means of a bolt 42 or 42' which runs through hub 43 or 43' located at the end of rod 40 or 40'. A sleeve 44 or 44' which surrounds the bolt in the area between the respective hub and frame member may then be used to ensure that the hub of the rod is properly distanced from the frame member. Preferably, however, such securement is achieved by the means shown in FIG. 8 which include a base plate 60 having a bearing member 61 welded thereto. The bearing member 61 has a short axle 62 projecting outwardly therefrom in a direction opposite the frame. The axle 62 is received within the hub 43 or 43' located at the end of each of the tie bars 40 or 40'. A cap 63 is fastened to the end of the axle to secure the tie bar 40 in place for pivotal movement around the axle. The base plate 60 is secured to the frame by four bolts 64. To permit the tie bar assembly to float during use, stiff compression springs 65 surround the bolts between the bolts' head and the face of the base plate.

Figure 7:
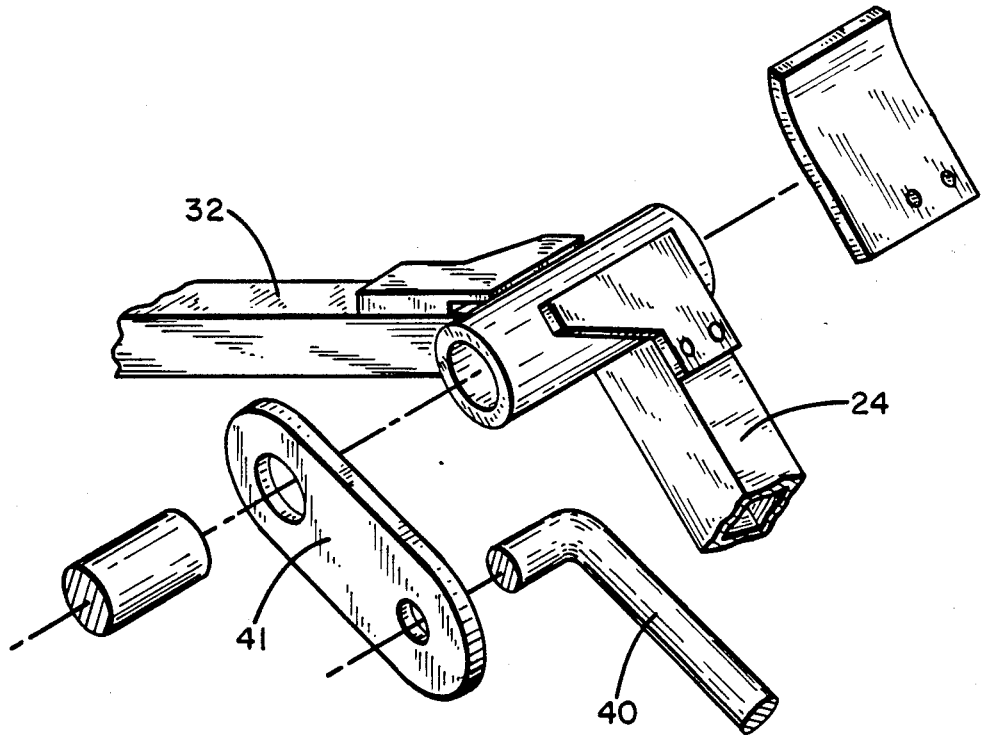
FIG. 7 is an enlarged, blown-apart, partial view of the pivot joints between the two arms of the tag axle assembly and the joint through which the tie bar is connected to the arms.

The other end of each tie bar 40 and 40' is attached to one end of an associated bell crank 41 and 41'. The opposite end of each bell crank 41 or 41' is attached to the end of angular arm 32 or 32' respectively at a point displaced a short predetermined distance from the point at which they are respectively hinged to arm 24 or 24'. FIG. 7 is intended to more clearly show the manner in which arm 24 is hinged to angular arm 32 as well as the means by which the bell crank 41 is secured to the arms and the tie rod 40.

Figure 9:
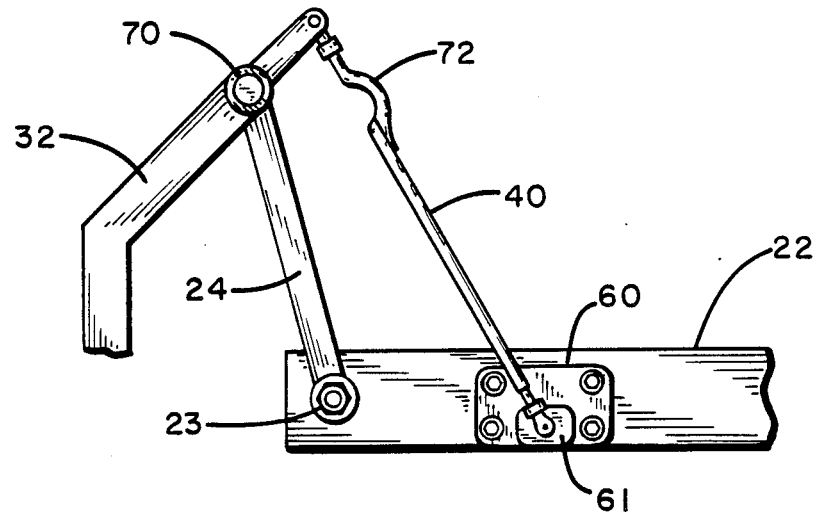
FIG. 9 is an alternative embodiment wherein the bell crank has been eliminated and the tie bar has been reshaped.

FIG. 9 shows an alternative embodiment prefered in some circumstances. In this embodiment the tie bar 40 is relatively straight. Near its end opposite the hub which is used to secure it to the frame, however, it has been curved 72 so that it will not engage the associated connection 70 between the torque arm 24 and angulated arm 32. Also, at the end near curve 72 there is a bore through the tie bars. In this embodiment, the angulated arm 32 on each side of the truck frame extends beyond the point where it is hinged to the torque arm 24 and includes a bore through it at a point near its end. When assembled, a bolt is passed through this bore in the angulated arm 32 and the bore in the tie bar 40 to create a pivoting connection. A locking nut is screwed on to the bolt to hold the parts in place.

When in operation the tie bars and associated bell cranks described above will permit the tag axle assembly to be shifted from a stowed position to a ground engaging disposition by the operator utilizing a suitable hydraulic control lever or electric switch (not shown) so as to cause the ram of the hydraulic actuator 30 to be extended or retracted as desired. As the cylinder is actuated, a torque is applied to the cross beam 28 via the horn mechanism 27 causing the torque arms 24 and 24' to rotate. Depending on whether the hydraulic actuator is being retracted or extended, this action will either raise or lower the assembly. The tie bars act in conjunction with the hydraulic actuator automatically to move the tag axle assembly into the desired positions.

Figure 4:
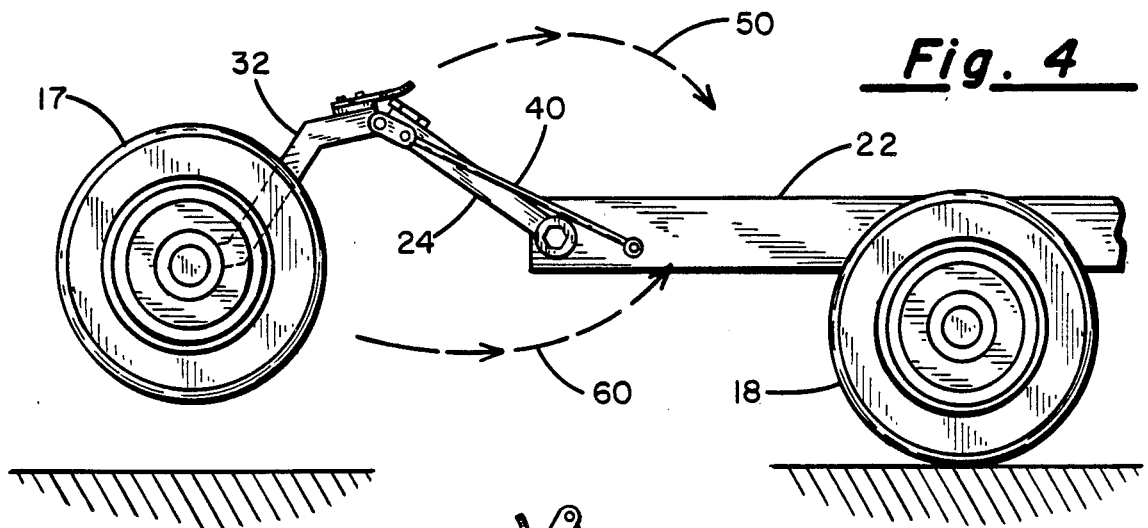
FIG. 4 is a side sectional view as in FIG. 3 but showing the orientation of the tag wheel assembly midway between its stowed and ground engaging position.
Figure 5:
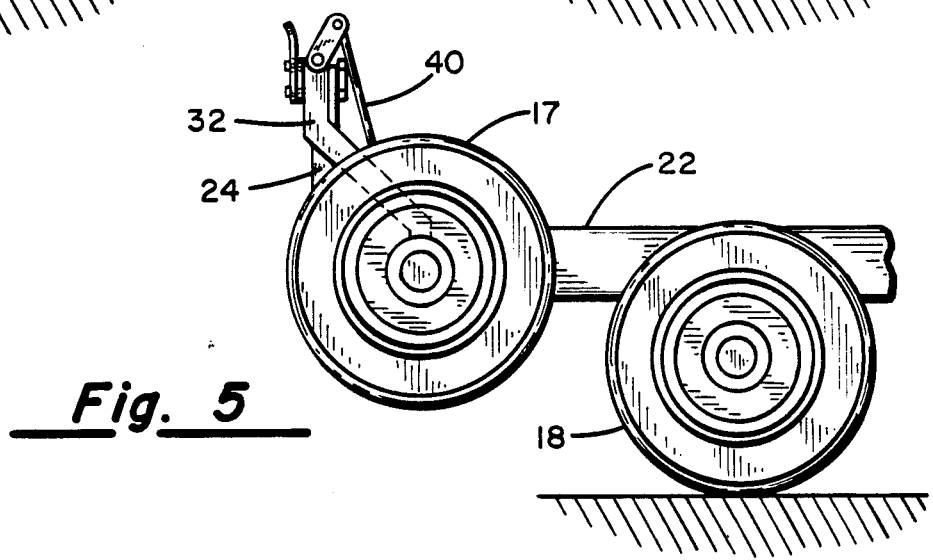
FIG. 5 is a partial side view showing the tag wheel assembly in its fully stowed position.
Figure 6:
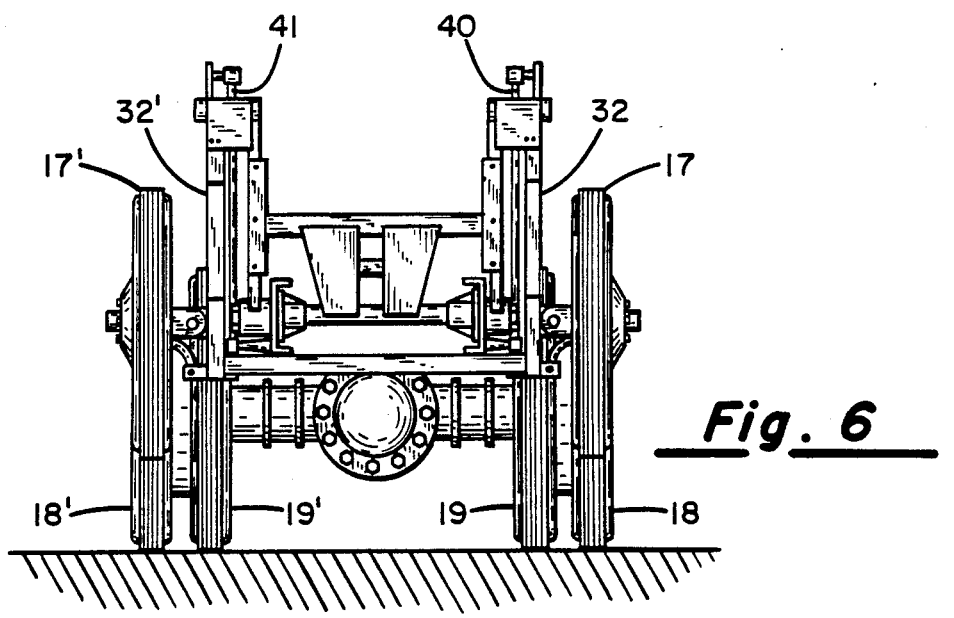
FIG. 6 is a rear elevation of the vehicle, again showing the tag axle assembly in its fully stowed position.

More specifically, when it is desired to shift the position of the tag axle from its ground engaging position to its stowed position, the operator uses the hydraulic control lever or electronic switch so as to cause the hydraulic actuator 30 to retract its ram. In doing so a torque is applied to the torque arms 24 and 24' via the horn mechanism 27 causing the torque arms 24 and 24' to rotate clockwise when viewed as in FIG. 3. This action begins to lift the assembly. Once the tires of the tag axle are free of the ground the tie bars 40 and 40' in conjunction with the continued retraction of the ram of the main cylinder 30 will automatically cause the torque arms 24 and 24' to be rotated in a clockwise direction, the bell cranks 41 and 41' to move in a counterclockwise direction, the hub element between arms 24 and 32 to move in the direction of arrow 50 of FIG. 4, and the wheels to move in the direction of arrow 60 of FIG. 4. Continued actuation of the main cylinder moves the tag wheel assembly to the stowed disposition as indicated in FIG. 5.

To position the tag axle assembly for over the road use, the operator again actuates the appropriated hydraulic control lever, this time to extend the ram of the hydraulic actuator 30. The extension of the ram of actuator 30 swings the tag axle assembly rearward relative to the frame of the truck as indicated by arrow 70 in FIG. 1 to its fully extended disposition shown in FIG. 3. The tie rod and the bell crank cause the angular arm to extend in the direction and through the path desired.

The invention that has been described herein in considerable detail in order to supply those skilled in the art the information needed to apply in novel principals of the present invention. The invention can be carried out by specifically different equipment and devices, and various modifications, both to the equipment details and the operating procedures can be accomplished without departing from the scope of the invention itself.

We claim:
1. In combination with a truck of the type having a longitudinally extending frame including first and second spaced-apart side members supported on a plurality of transversely extending axles, said axles each having one or more wheels affixed to the opposite end thereof, a hydraulically actuatable tag axle assembly comprising:
   (a) first and second articulated arm means, each pivotally attached at one end thereof to said first and second side members of said frame proximate the rear end of said frame members;
   (b) first and second stub axle means extending perpendicularly outward from said first and second articulated arm means, respectively;
   (c) further wheel means journal for rotation on said first and second stub axle means;
   (d) a drop axle, joined between said first and second articulated arm means, said drop axle including a transversely extending bar of length sufficient to span the width dimension of said frame and offset from the rotational axis of said wheels;
   (e) hydraulic actuator means operatively coupled to said articulated arm means and to said frame for moving said further wheel means between a ground-engaging disposition rearward of the ends of said first and second side members of said frame and an elevated disposition wherein said wheel means straddle the rear portion of said first and second side members of said frame; and
   (f) non-extendible means for guiding the pivotal movement of said first and second articulated arm means during said movement of said further wheel means between said ground-engaging disposition and said elevated disposition.

2. The combination as in claim 1 wherein said first and second articulated arm means each comprises:
   (a) a first linkage pivotally attached at a first end thereof to one of said first and second side members of said frame proximate the rear end thereof, said first linkage having a laterally projecting hub the central bore extending transversely relative to said first linkage; and
   (b) a second linkage having first and second parallel segments joined by an integrally formed transversal to define generally equal alternate obtuse angles, said first segment having a laterally projecting hub with a central bore, said second segment having said stub axle extending perpendicular thereto, said transversely extending bar connecting said second segment of said second linkage of said first articulating arm means to said second segment of said second linkage of said second articulated arm means; and
   (c) a hinge pin extending through said central bores of said hubs on said first and second linkages when said bores are laterally aligned.

3. The combination as in claim 2 wherein said hydraulic actuator means comprises a main hydraulic cylinder, operatively coupled between said frame and said first linkages of said first and second articulated arm means.

4. The combination as in claim 2 wherein said stub axles are pivotally joined to said second segments of said linkages of said first and second articulated arm means.

5. The combination as in claim 4 and further including wheel means journaled for rotation on said first and second stub axles.

6. The combination as in claim 5 and further including tie rod means joining said wheel means on said first and second stub axles, said tie rod being in general parallel alignment with the transversely extending bar.

7. The combination as in claim 2 wherein said nonextendible means for guiding the pivotal movement of said first and second articulated arm means includes:
    (a) a first tie bar having a hub with a bore therethrough at one end and a hook at the other end thereof;
    (b) a first bolt passing through the hub of said first tie bar for securing said first tie bar to said first side member of said frame;
    (c) a first sleeve means surrounding said bolt in the area between said first side member of said frame and said hub of said first tie bar for maintaining a desired clearance distance between said first side member of said frame and said hub of said first tie bar; and
    (d) a first bell crank having two holes therethrough, one of said holes being mated with the hook of said first tie bar to secure the first bell crank to said first tie bar and the other of said holes being mated with said hinge pin extending through the central bores of said hubs of said first and second linkages of said first articulating arm means.

8. The combination as in claim 7 and further including:
    (a) a second tie bar having a hub with a bore therethrough at one of its ends and a hook at the other of its ends;
    (b) a second bolt passing through said hub of said second tie bar for securing said second tie bar to said second side member of said frame;
    (c) second sleeve means surrounding said bolt in the area between said second side member of said frame and said hub of said second tie bar for maintaining a desired clearance distance between said second side member of said frame and said hub of said second tie bar; and
    (d) a second bell crank having two holes therethrough, one of said holes being mated with said hook of said second tie bar to secure said second bell crank to said second tie bar and the other of said holes being mated with said hinge pin extending through said central bores of said hubs of said first and second linkages of said second articulated arm means.

9. The combination as in claim 2 wherein said transversely extending bar affixed to said second segment of said second linkage of said first and second articulated arm means is at a location displaced a predetermined distance beyond the location where said stub axles extend perpendicularly outward from said second segment of said second linkage of said first and second articulated arm means.

10. In combination with a truck of the type having a longitudinally extending frame member including first and second spaced-apart side members supported on a plurality of transversely extending axles, said axles each having one or more wheels affixed to the opposite ends thereof, a hydraulically actuatable tag axle assembly comprising:
    (a) first and second articulated arm means each including:
        (1) a first linkage pivotally attached at a first end thereof to one of said first and second side members of said frame proximate the rear end of said one of said side members, said first linkage having a laterally projecting hub with a central bore extending transverse to the longitudinal axis of said first linkage,
        (2) a second linkage having first and second parallel segments joined by an integrally formed transversal to define generally equal alternate obtuse angles, said first segment of said second linkage having a laterally projecting hub with a central bore and,
        (3) a hinge pin extending through said central bores of said hubs on said first and second linkages when said bores are laterally aligned;
    (b) first and second stub axle means extending perpendicular to the second segments of said first and second articulated arm means, respectively;
    (c) further wheels means journaled for rotation on said first and second stub axle means;
    (d) hydraulic actuator means including a main hydraulic cylinder operatively coupled between said frame and said first linkage of said first and second articulated arm means; and
    (e) guide means including:
        (1) a first tie bar pivotally secured at one of its ends to said first side member of said frame and at the other of its ends to one end of a first bell crank which is secured at its other end to said first articulated arm means;
        (2) a second tie bar pivotally secured at one of its ends to said second side member of said frame and at its other end to one end of a second bell crank which is secured at its other end to said second articulated arm means.

11. The combination as in claim 10 wherein said first bell crank is secured to said first articulated arm means by the hinge pin which extends through central to the side central bores of said hubs on said first and second linkages and said second bell crank is secured to said second articulating arm means by the hinge pin which extends through the side central bores of said hubs on said first and second linkages of said second articulated arms.

* * * * *